W. L. BURGESS.
VEHICLE TIRE RIM.
APPLICATION FILED OCT. 25, 1912.
1,171,502.   Patented Feb. 15, 1916.
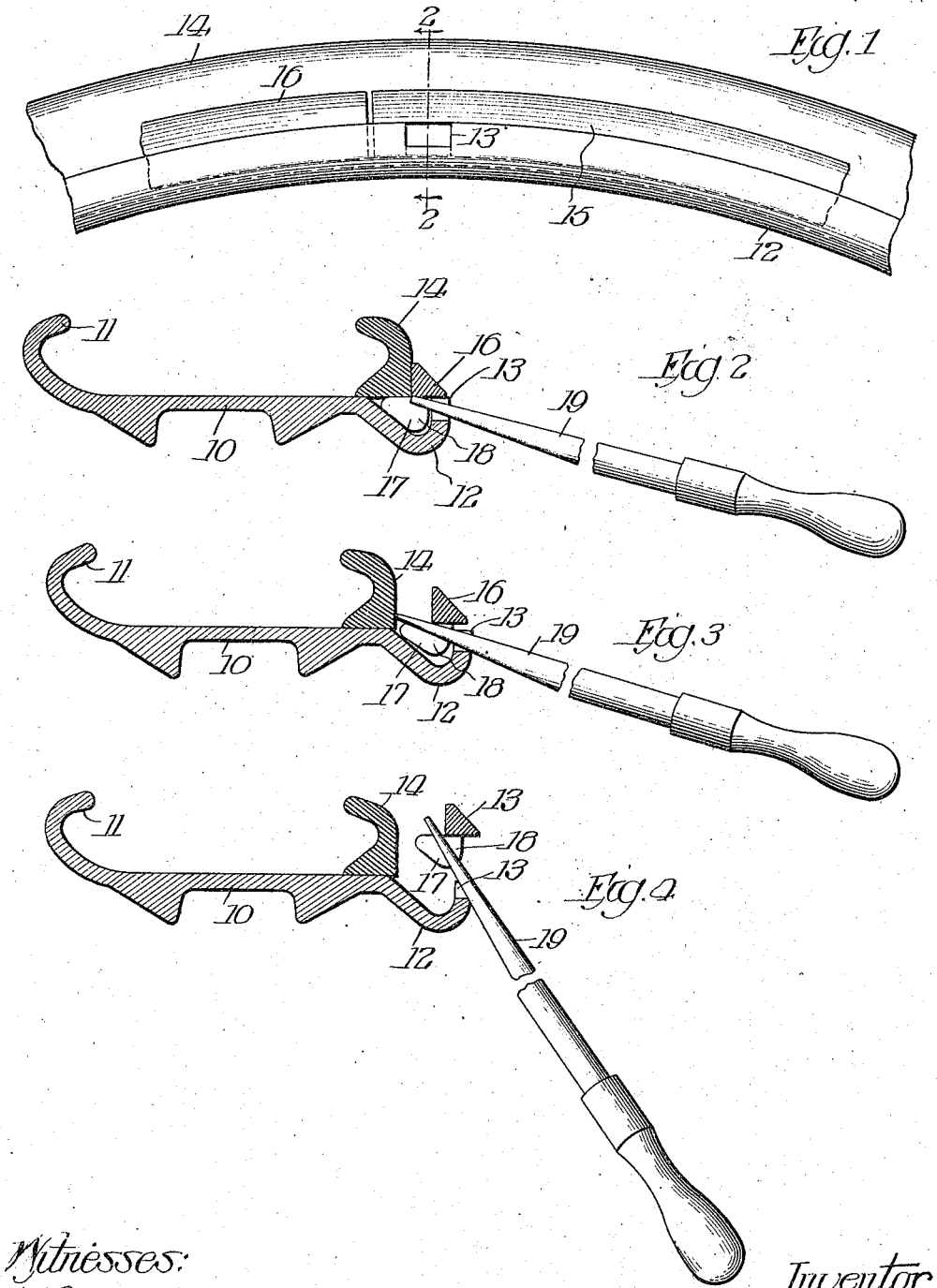

UNITED STATES PATENT OFFICE.

WILLIAM L. BURGESS, OF AKRON, OHIO, ASSIGNOR TO THE FIRESTONE TIRE & RUBBER COMPANY, OF AKRON, OHIO, A CORPORATION OF OHIO.

VEHICLE-TIRE RIM.

1,171,502.

Specification of Letters Patent. Patented Feb. 15, 1916.

Application filed October 25, 1912. Serial No. 727,668.

*To all whom it may concern:*

Be it known that I, WILLIAM L. BURGESS, a citizen of the United States, residing at Akron, Summit county, State of Ohio, have invented certain new and useful Improvements in Vehicle-Tire Rims, of which the following is a specification.

My invention relates to vehicle tire rims, and refers particularly to the construction of the locking ring whereby the latter may be readily removed from its engagement with the rim flange of the tire rim.

Heretofore considerable difficulty has been experienced in quickly and easily removing the locking ring used in connection with vehicle tire rims. In my present invention I provide the locking ring with a cavity or recess near its end so that a tool, such as a screw driver, or the like, may readily be inserted into this cavity and the locking ring may thereby be removed from engagement with the rim flange. In many styles of vehicle tire rims a movable retaining flange is employed which holds the tire casing in position. The construction of my improved tire rim is such that when the tool above mentioned is inserted in the cavity of the locking ring the retaining flange is forced inwardly and becomes disengaged from the inner portion of the locking ring over which the retaining flange extends when the various parts are in their normal positions. These and other advantages of my invention will be more readily understood by reference to the accompanying drawings, which show a preferred embodiment of my improvements, and in which—

Figure 1 is a fragmentary side elevation of a portion of a tire rim; Fig. 2 is a transverse section taken on the line 2—2 of Fig. 1, and showing the various parts in normal position with the tool inserted in the cavity of the locking ring; Fig. 3 is a view similar to Fig. 2, except that the retaining flange has been moved inwardly by the tool and the locking ring has been partly raised out of position; and Fig. 4 is a view similar to Figs. 2 and 3 except that the locking ring is shown as being completely removed from the rim flange.

The rim 10 is provided with a side flange 11 and a rim flange 12 which contains at one portion thereof the recess or aperture 13. The tire which is adapted to be applied to this rim is held between the fixed flange 11 and a movable retaining flange 14, the latter being adapted to have lateral movement across the face of the rim 10.

The integral locking ring 15 consists of an outer triangular portion 16 and an inner triangular portion 17. The upright wall of the portion 16 is adapted to hold the retaining flange 14 against lateral movement while the inner wall of the portion 16 engages over the edge of the rim flange 12. The portion 17 of the locking ring fits within the rim flange 12, and the upper surface of said portion underlies the base of the retaining flange 14. The locking ring 15 is provided near one end with an aperture or recess 18 in the portion 17. In applying the locking ring this recess 18 is placed opposite or in register with the aperture 13 in the rim flange 12.

Having thus described the parts used in my invention, the operation of the same may readily be understood. Assuming that all of the parts are in their normal position, as shown in Figs. 1 and 2, when it is desired to remove the locking ring in order to subsequently remove the tire from the rim, the end of a screw driver 19, or other similar tool, is inserted through the recess 13 of the rim flange 12, the end of the tool also passing through the aperture 18 of the locking ring. The end of the tool engages the retaining flange 14, and the latter is then pushed inwardly, as represented in Fig. 3, while at the same time the end of the tool 19 is gradually raised upon the rim flange 12 as a fulcrum, so that the locking ring is pried out of its engagement with the rim flange 12. After one end of the locking ring has thus been removed, the entire locking ring may readily be pulled out of engagement with the rim flange, as will be readily understood.

It will be clear to those skilled in the art that considerable change could be made in the detailed construction of the parts which I have described without departing from the spirit or scope of my invention.

What I claim is:

1. In a vehicle tire rim, the combination of a locking ring having a recess therein, and a rim flange adapted to receive said locking ring, said rim flange also having a recess therein which registers with the recess of said locking ring, whereby a tool may be introduced through said recesses and the locking ring may be pried out of engagement with the rim flange, substantially as described.

2. In a vehicle tire rim, the combination of a locking ring split on a substantially transverse line and having an aperture in its inner surface near one end, and a rim flange adapted to receive said locking ring, said rim flange having an aperture therethrough registering with the aperture of said locking ring, whereby a tool may be introduced through said apertures and the locking ring may be pried out of engagement with the rim flange, substantially as described.

3. In a vehicle tire rim, the combination of a movable retaining flange, a rim flange, and a locking ring adapted to engage said rim flange and having a portion projecting beneath said retaining flange, said locking ring and said rim flange having registering recesses therein whereby a tool may be introduced through said recesses and said retaining flange may be moved laterally to clear said locking ring and the latter may then be removed from engagement with said rim flange, substantially as described.

WILLIAM L. BURGESS.

Witnesses:
F. H. MOYER,
W. M. ANDREW.